United States Patent
Saliba

(10) Patent No.: US 11,887,625 B1
(45) Date of Patent: Jan. 30, 2024

(54) TAPE DRIVE WITH A TAPE ROLLER ASSEMBLY THAT INCLUDES A ROLLER MEMBER AND A STOP MECHANISM

(71) Applicant: MagStor Inc., Columbus, OH (US)

(72) Inventor: George A Saliba, Boulder, CO (US)

(73) Assignee: MagStor Inc., Columbus, OH (US)

( * ) Notice: Subject to any disclaimer, the term of this patent is extended or adjusted under 35 U.S.C. 154(b) by 0 days.

(21) Appl. No.: 18/097,227

(22) Filed: Jan. 14, 2023

Related U.S. Application Data

(60) Provisional application No. 63/299,872, filed on Jan. 14, 2022.

(51) Int. Cl.
  *G11B 23/50* (2006.01)
  *G11B 15/60* (2006.01)
  *G11B 15/29* (2006.01)

(52) U.S. Cl.
  CPC ............ *G11B 23/502* (2013.01); *G11B 15/60* (2013.01); *G11B 15/29* (2013.01)

(58) Field of Classification Search
  None
  See application file for complete search history.

(56) References Cited

U.S. PATENT DOCUMENTS

| | | | | |
|---|---|---|---|---|
| 5,088,172 | A * | 2/1992 | Daly | G11B 15/60 492/35 |
| 6,754,033 | B1 * | 6/2004 | Argumedo et al. | G11B 15/605 360/130.21 |
| 6,994,293 | B1 * | 2/2006 | Coburn | G11B 15/602 242/615.4 |
| 10,354,686 | B1 * | 7/2019 | Rueger et al. | G11B 5/00813 |
| 10,692,524 | B2 | 6/2020 | Rueger et al. | |
| 11,200,194 | B1 | 12/2021 | Mindlin | |
| 2001/0002158 | A1 * | 5/2001 | Cope et al. | G11B 15/602 360/130.21 |
| 2003/0029952 | A1 * | 2/2003 | Poorman | G11B 15/605 226/193 |
| 2003/0048583 | A1 * | 3/2003 | Tanaka | G11B 15/602 360/130.21 |
| 2003/0089819 | A1 * | 5/2003 | Bloomquist et al. | G11B 15/605 242/615.4 |
| 2007/0285840 | A1 * | 12/2007 | Kitamura | G11B 15/605 360/134 |
| 2014/0362465 | A1 * | 12/2014 | Anderson et al. | G11B 15/605 360/90 |

* cited by examiner

*Primary Examiner* — Craig A. Renner
(74) *Attorney, Agent, or Firm* — The Law Office of Patrick F. O'Reilly III, LLC

(57) ABSTRACT

A tape drive includes a tape transport assembly, the tape transport assembly including a drive member, the drive member of the tape transport assembly configured to displace tape media in the tape drive; and a tape roller assembly, the tape roller assembly including a roller member, the roller member having one or more slanted grooves or protrusions formed in an outer surface of the roller member, the roller member configured to support and/or guide the tape media as the tape media is displaced by the tape transport assembly, the one or more slanted grooves or protrusions of the roller member configured to burnish and/or clean the tape media so as to prevent damage to a tape head, and the one or more slanted grooves or protrusions of the roller member being angled so as to prevent the tape media from sliding in an axial direction of the roller member.

18 Claims, 6 Drawing Sheets

TAPE DRIVE WITH A TAPE ROLLER ASSEMBLY THAT INCLUDES A ROLLER MEMBER AND A STOP MECHANISM

CROSS-REFERENCE TO RELATED APPLICATIONS

This patent application claims priority to, and incorporates by reference in its entirety, U.S. Provisional Patent Application No. 63/299,872, entitled "Tape Drive With A Tape Roller Assembly", filed on Jan. 14, 2022.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a tape drive with a tape roller assembly. More particularly, the invention relates to a tape drive with a tape roller assembly for burnishing and/or cleaning tape media, as well as guiding the tape media.

2. Background

It is well known that new Linear Tape-Open (LTO) tape media, which is commonly referred to as "green media", has high abrasiveness, contaminants, and excessive lubrication. As such, "green media" often causes tape head damage. Media vendors attempt to control the size and amount of abrasive material in the media, as well as burnish and clean the media at the factory. However, despite all their best efforts, "green media" continues to cause excessive head wear and media defects at customer's site. This fact is becoming a serious problem for the new generations of LTO tape drives.

Therefore, what is needed is a tape drive with a tape roller assembly for burnishing and/or cleaning tape media so as to prevent tape head damage, while also guiding the tape media.

BRIEF SUMMARY OF EMBODIMENTS OF THE INVENTION

Accordingly, the present invention is directed to a tape drive with a tape roller assembly that substantially obviates one or more problems resulting from the limitations and deficiencies of the related art.

In accordance with one or more embodiments of the present invention, there is provided a tape drive that includes a tape transport assembly, the tape transport assembly including a drive member, the drive member of the tape transport assembly configured to displace tape media in the tape drive; and a tape roller assembly, the tape roller assembly including a roller member, the roller member having one or more slanted grooves or protrusions formed in an outer surface of the roller member, the roller member configured to support and/or guide the tape media as the tape media is displaced by the tape transport assembly, the one or more slanted grooves or protrusions of the roller member configured to burnish and/or clean the tape media so as to prevent damage to a tape head, and the one or more slanted grooves or protrusions of the roller member being angled so as to prevent the tape media from sliding in an axial direction of the roller member.

In a further embodiment of the present invention, the tape drive is in a form of a peripheral tape drive configured to be operatively coupled to a computing device, the peripheral tape drive further comprising the tape head, the tape head configured to perform read-write operations on the tape media, and the roller member configured to burnish and/or clean the tape media so as to prevent damage to the tape head of the peripheral tape drive.

In yet a further embodiment, the tape drive is provided as a part of a tape library, the tape drive further comprising the tape head, the tape head configured to perform read-write operations on the tape media, and the roller member configured to burnish and/or clean the tape media so as to prevent damage to the tape head of the tape drive in the tape library.

In still a further embodiment, the tape drive is used to precondition the tape media prior to the tape media coming into contact with the tape head so as to prevent damage to the tape head.

In yet a further embodiment, the one or more slanted grooves or protrusions formed in the outer surface of the roller member comprise at least one pair of slanted opposed grooves that use a lapping action to burnish and/or clean the tape media, each of the slanted opposed grooves being disposed at an acute angle relative to a rotational axis of the roller member.

In still a further embodiment, the at least one pair of slanted opposed grooves formed in the outer surface of the roller member comprises a plurality of pairs of slanted opposed grooves spaced apart from one another about a circumference of the roller member.

In yet a further embodiment, the plurality of pairs of slanted opposed grooves create a helical pattern when the roller member is rotated about the rotational axis thereof.

In still a further embodiment, the respective grooves of the at least one pair of slanted opposed grooves converge towards one another at a first end of the roller member such that ends of the converging opposed grooves are located closer to one another at the first end of the roller member as compared to a second end of the roller member that is oppositely disposed relative to the first end of the roller member.

In yet a further embodiment, the tape roller assembly further comprises a stop mechanism that restricts the roller member to rotating less than 360 degrees; and the lapping action of the slanted opposed grooves in the roller member is achieved by limiting the rotation of the roller member, and then slipping action between the tape media and the roller member creates the lapping action between the tape media and the edges of slanted opposed grooves, and when the rotation of the roller member has ceased, the slanted opposed grooves allow the drive member of the tape transport assembly to operate normally because the slanted opposed grooves create a stabilizing guiding force, while the edges of slanted opposed grooves remove excess debris away from the tape media, and into the grooves.

In still a further embodiment, the edges of the slanted opposed grooves smooth high level asperities and/or peaks in the tape media that are known to cause magnetoresistance recession; and the slipping action between the tape media and the roller member results in a desired smoothing of a damaging portion of an abrasive material in the tape media that damages the tape head.

In yet a further embodiment, the one or more slanted grooves or protrusions formed in the outer surface of the roller member comprise a plurality of slanted protrusions that use a lapping action to burnish and/or clean the tape media, each of the slanted protrusions being disposed at an acute angle relative to a rotational axis of the roller member.

In still a further embodiment, at least some of the slanted protrusions are spaced apart from one another about a circumference of the roller member by respective triangular recesses formed in the outer surface of the roller member.

In yet a further embodiment, the tape roller assembly further comprises a stop mechanism, the roller member being configured to rotate less than 360 degrees as the drive member of the tape transport assembly changes direction so that the tape stiction is able to dissipate, and then the stop mechanism is configured to prevent the roller member from further rotating so as to allow the one or more slanted grooves or protrusions of the roller member to burnish and/or clean the tape media.

In still a further embodiment, the tape roller assembly further comprises a shaft member, the roller member configured to rotate about the shaft member.

In yet a further embodiment, the tape roller assembly further comprises a roller bearing member, the roller bearing member configured to engage the shaft member such that roller bearing member remains stationary with the shaft member as the roller member rotates about the shaft member.

In still a further embodiment, the stop mechanism comprises a first stop element on the roller member and a second stop element on the roller bearing member, and the roller member is prevented from further rotation when the first stop element on the roller member contacts the second stop element on the roller bearing member.

In yet a further embodiment, the tape drive comprises the tape head, the tape head configured to perform read-write operations on the tape media, and the tape roller assembly is disposed in a location that is upstream of the tape head so that the tape media is burnished and/or cleaned prior to reaching the tape head of the tape drive.

In still a further embodiment, the roller member is formed from a material selected from the group consisting of: (i) steel, (ii) stainless steel, and (iii) ceramic.

In yet a further embodiment, the roller member is coated with a material selected from the group consisting of: (i) ceramic, (ii) diamond, and (iii) diamond-like carbon.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 8:
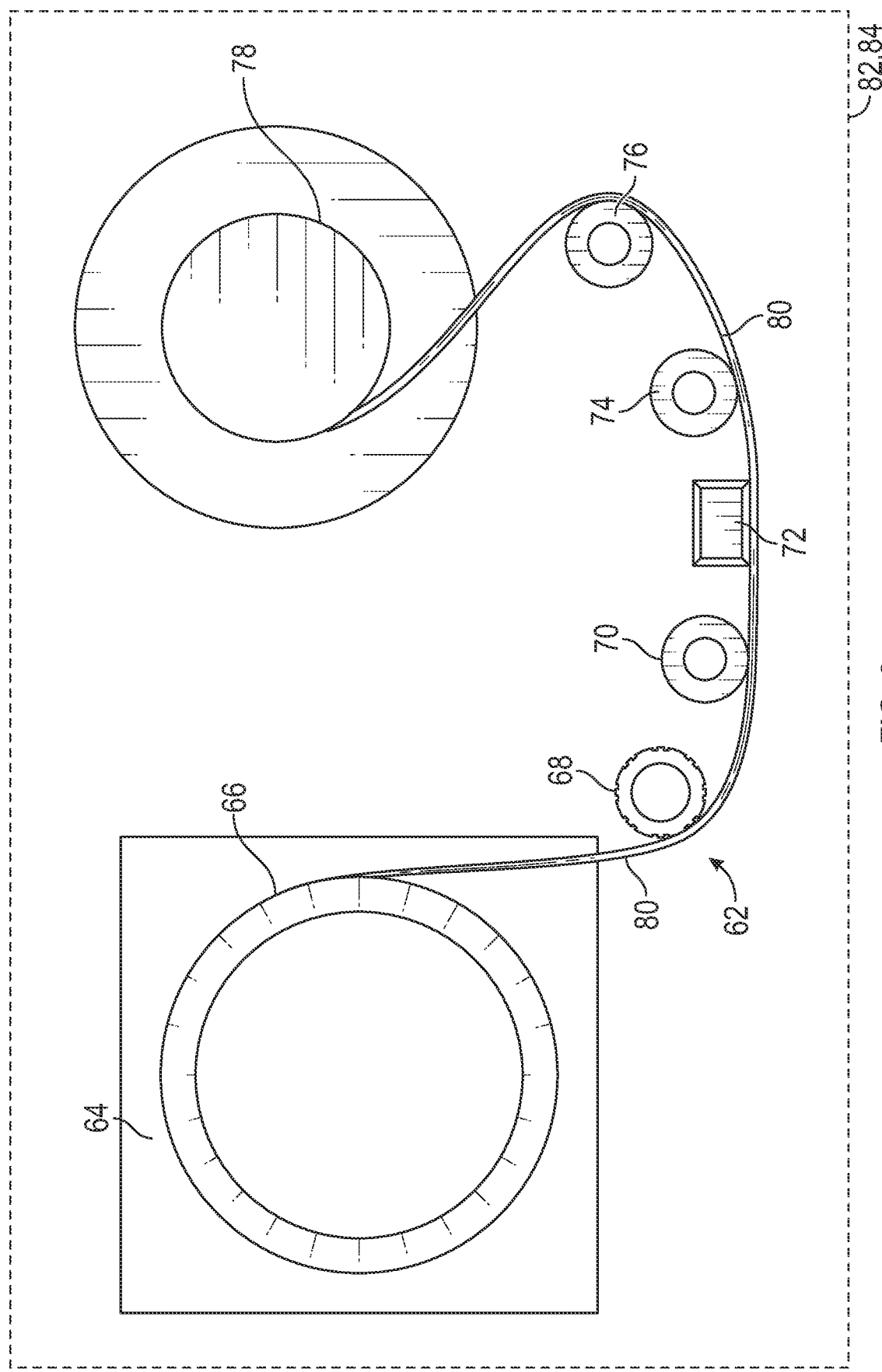
FIG. 8 is a schematic diagram of a tape drive, according to an illustrative embodiment of the invention.

An illustrative embodiment of a magnetic tape drive is seen generally at 62 in FIG. 8. FIG. 8 depicts a schematic diagram of the basic internal components of a magnetic tape drive 62 with magnetic tape media 80. Referring to FIG. 8, it can be seen that the magnetic tape drive 62 generally comprises a tape transport assembly, the tape transport assembly including a drive member (e.g., take-up reel 78), the drive member 78 of the tape transport assembly configured to displace magnetic tape media 80 in the tape drive 62; and a tape roller assembly, the tape roller assembly including a cleaning roller member 68, the roller member 68 having one or more slanted grooves or protrusions formed in an outer surface of the roller member 68, the roller member 68 configured to support and/or guide the magnetic tape media 80 as the magnetic tape media 80 is displaced by the tape transport assembly, the one or more slanted grooves or protrusions of the roller member 68 configured to burnish and/or clean the magnetic tape media 80 so as to prevent damage to a tape head 72, and the one or more slanted grooves or protrusions of the roller member 68 being angled so as to prevent the magnetic tape media 80 from sliding in an axial direction of the roller member 68 (i.e., the angular orientation of the slanted grooves or protrusions of the roller member prevents the tape media 80 from sliding up or down, and keeps the tape media 80 generally centered across the width of the roller member). In other words, the angular orientation of the slanted grooves or protrusions of the roller member maintains the tape media 80 in a generally centered position on the roller member. Advantageously, as will be explained in further detail hereinafter, the angular orientation of the slanted grooves or protrusions of the roller member 68 result in the simultaneous cleaning, burnishing, and guiding of the tape media (i.e., all three functions are performed simultaneously by the roller member 68).

In the illustrative tape drive 62 of FIG. 8, a tape cartridge 64 comprising the tape media 80 is inserted into the tape drive 62. The tape media 80 is partially reeled off the cartridge reel 66, guided in a tensioned manner out of the cartridge 64 and through the rollers 68, 70, 74, 76 in the tape drive 62, and reeled up on the take-up reel 78 of the tape drive 62 without the tape cartridge 64. The four (4) rollers 68, 70, 74, 76 are arranged in a sequence from the cartridge 64 of the tape drive 62 to the take-up reel 78, and a tape head 72 is located in the middle between the second roller 70 and the third roller 74. The tape head 72 is configured to perform read-write operations on the tape media 80. In the illustrative embodiment of FIG. 8, the first roller in the sequence is the cleaning roller 68, but in other embodiments, some or all of the other rollers 70, 74, 76 of the tape drive 62 may also comprise cleaning rollers.

In the illustrative embodiment of FIG. 8, the cleaning roller 68 is disposed in a location that is upstream of the tape head 72 so that the tape media 80 is burnished and/or cleaned prior to reaching the tape head 72 of the tape drive 62. In the illustrative embodiment, the cleaning roller is arranged with its rotational axis perpendicular to tape transport direction.

In the illustrative embodiment, the tape drive 62 is in a form of a Linear Tape-Open (LTO) tape drive that accommodates magnetic LTO tape media. Also, in the illustrative embodiment, the cleaning roller may have a width between approximately 13 millimeters and approximately 18 millimeters, inclusive (or between 13 millimeters and 18 millimeters, inclusive) in the axial direction of the cleaning roller, which may allow the cleaning roller to burnish the tape media across the whole width of the tape without missing the boundaries of the tape (i.e., for an LTO tape width of approximately 12.650 millimeters).

Now, turning to FIGS. 1-4, an illustrative embodiment of a cleaning roller assembly 10, which may be used in the illustrative tape drive 62 of FIG. 8 will be described. As best shown in the exploded perspective view of FIG. 3, the cleaning roller assembly generally comprises a shaft member 12, a roller member 18, and a roller bearing member 30. In the cleaning roller assembly 10 of FIGS. 1-4, the roller member 18 is configured to rotate about the shaft member 12. The roller bearing member 30 is configured to engage the shaft member 12 such that roller bearing member 30 remains stationary with the shaft member 12 as the roller member 18 rotates about the shaft member 12. More specifically, in the illustrative embodiment, the central aperture 34 of the roller bearing member 30 has flattened side portions 36 that correspond to flattened side portions 16 of the shaft member 12 such that the roller bearing member 30 is unable to rotate relative to the shaft member 12. In the illustrative embodiment, the roller member 18 is a passive roller (i.e., roller member 18 is not driven by a motor, but rather the roller member 18 is only rotated by the travel of the tape media).

Figure 1:
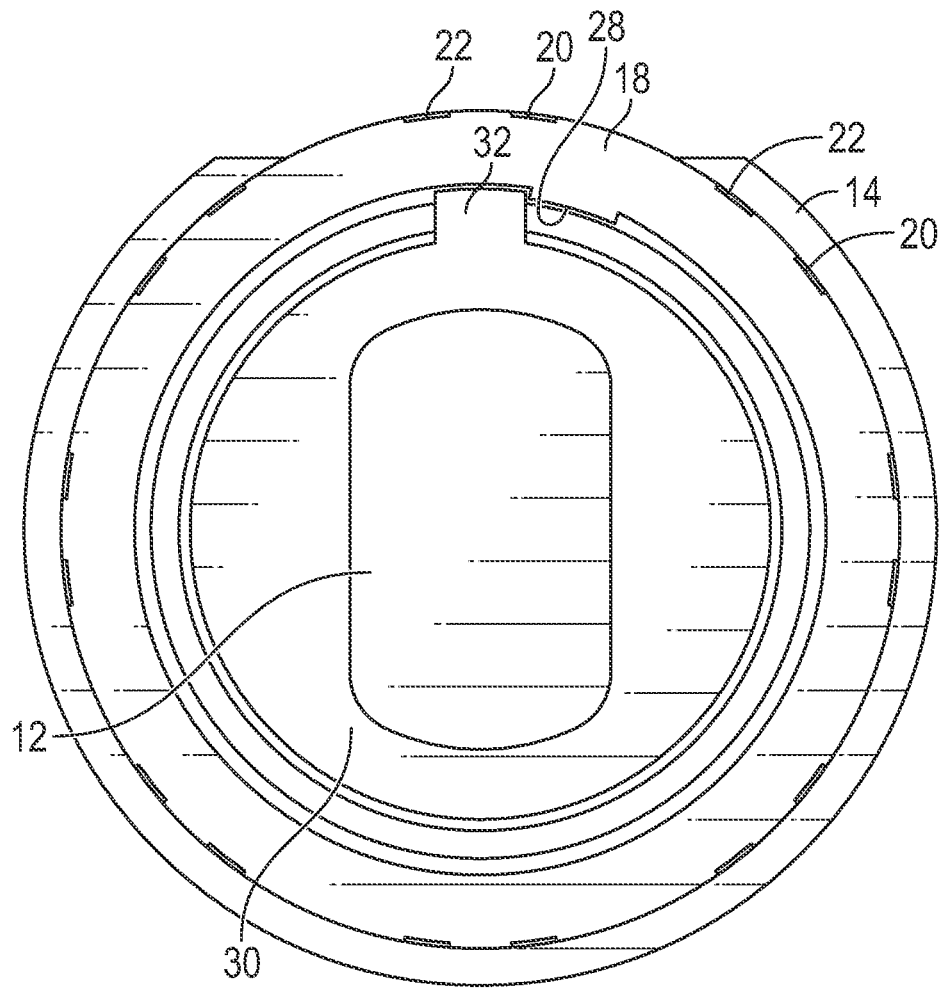
FIG. 1 is a front elevational view of a tape roller assembly, according to an illustrative embodiment of the invention.
Figure 2:
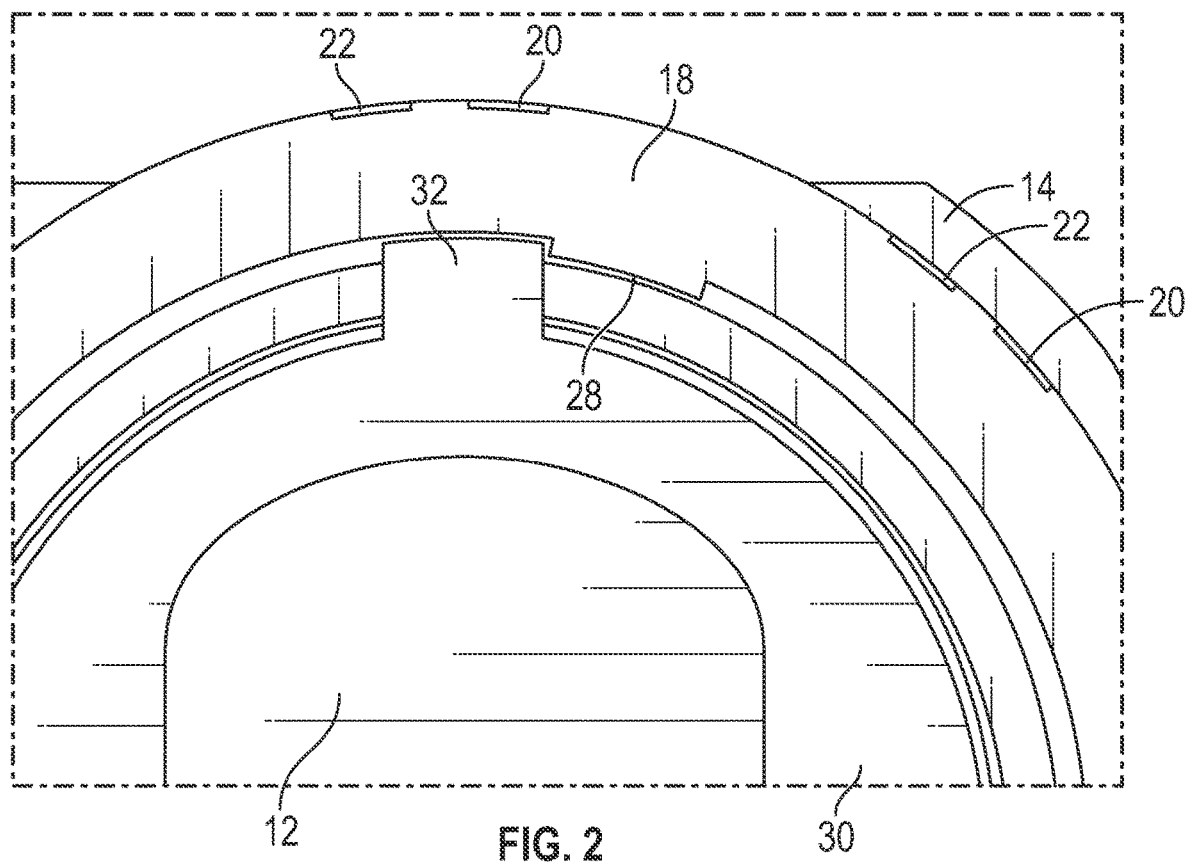
FIG. 2 is an enlarged portion of the front elevation of the tape roller assembly depicted in FIG. 1.
Figure 3:
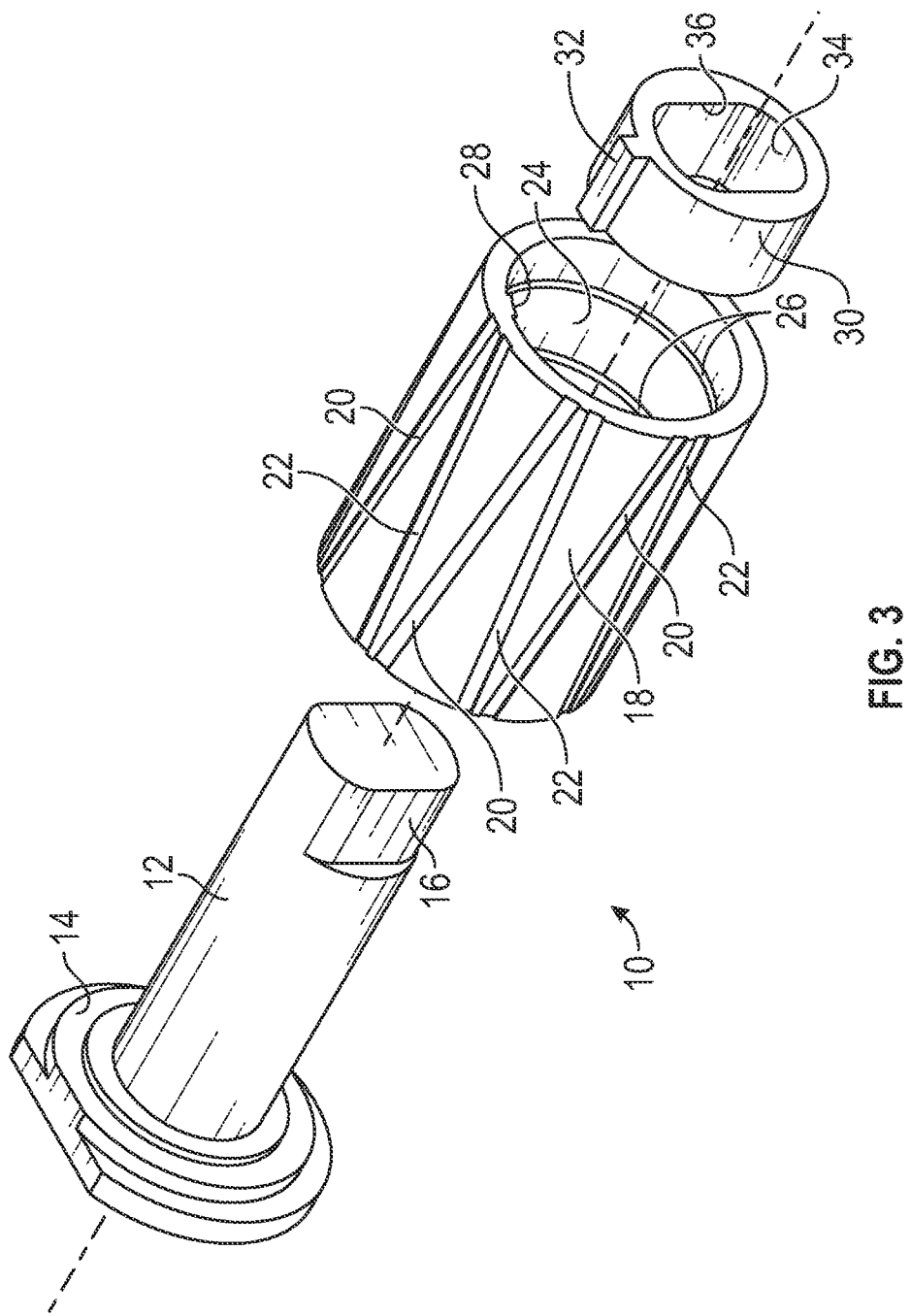
FIG. 3 is a exploded perspective view of the tape roller assembly depicted in FIG. 1.
Figure 4:
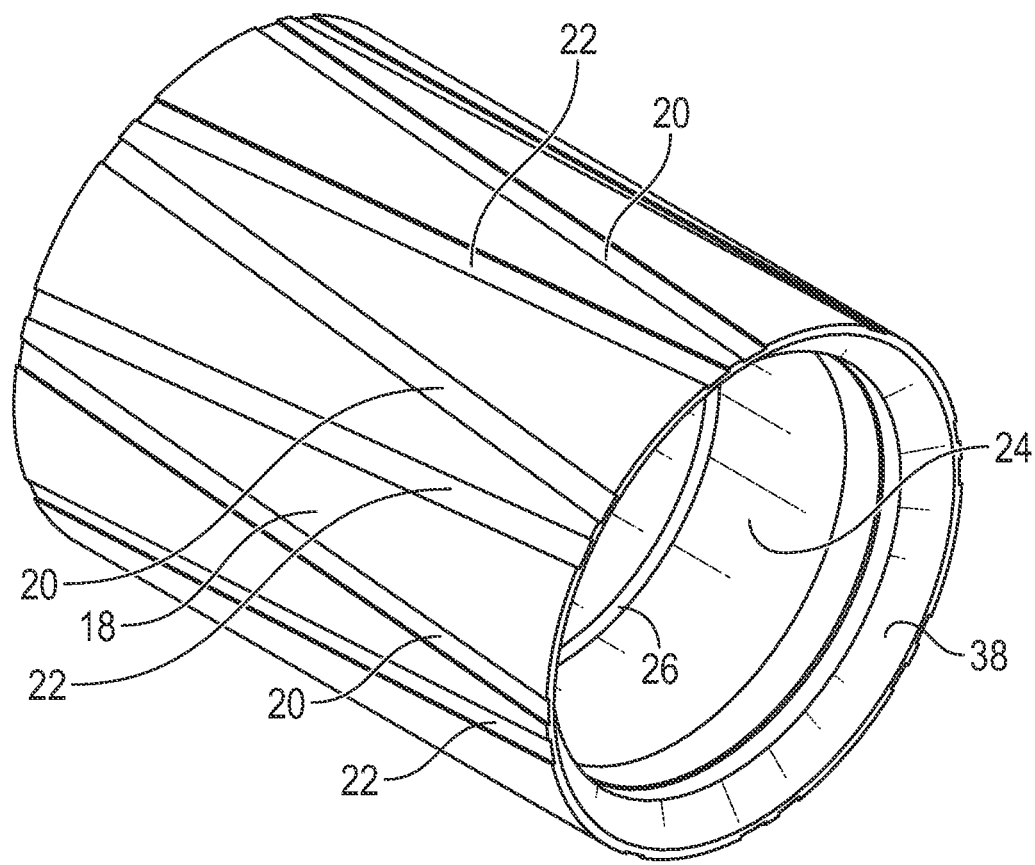
FIG. 4 is a perspective view of the cleaning roller of the tape roller assembly depicted in FIG. 1, wherein the roller is provided with a plurality of slanted grooves.

With combined reference to FIGS. 3 and 4, it can be seen that, in the illustrative embodiment, the outer surface of the roller member 18 comprises a plurality of pairs of slanted opposed grooves 20, 22 that use a lapping action to burnish and/or clean the tape media (e.g., tape media 80 in FIG. 8). In the illustrative embodiment, each of the slanted opposed grooves 20, 22 is disposed at an acute angle relative to a rotational axis of the roller member 18 (see FIG. 3). Also, as shown in the illustrative embodiment of FIGS. 3 and 4, the plurality of pairs of slanted opposed grooves 20, 22 are spaced apart from one another about a circumference of the roller member 18. Referring again to FIGS. 3 and 4, it can be seen that the respective grooves 20, 22 of the pairs of slanted opposed grooves converge towards one another at a first end of the roller member 18 such that ends of the converging opposed grooves 20, 22 are located closer to one another at the first end of the roller member 18 as compared to a second end of the roller member 18 that is oppositely disposed relative to the first end of the roller member 18. In other words, the converging opposed grooves 20, 22 have a V-shaped configuration in the illustrative embodiment. The plurality of pairs of slanted opposed grooves 20, 22 create a helical pattern (e.g., a pattern in the form of a double helix) when the roller member 18 is rotated about the rotational axis thereof. Advantageously, the slanted opposed grooves 20, 22 of the roller member 18, which are arranged in the helical pattern, result in the simultaneous cleaning, burnishing, and guiding of the tape media (i.e., all three functions are performed simultaneously by the roller member 18).

In the illustrative embodiment, the acute angle of each of the slanted opposed grooves 20, 22 relative to the rotational axis of the roller member 18 is between approximately 1 degree and approximately 10 degrees, inclusive (or between 1 degree and 10 degrees, inclusive). However, it is to be understood that, in other embodiments, other suitable angles may be used for the slanted opposed grooves 20, 22. Also, in the illustrative embodiment, each groove 20, 22 of the roller member 18 has a width approximately equal to 20 milliinches (approximately 0.51 millimeters). However, it is to be understood that, in other embodiments, other suitable widths may be used for the slanted opposed grooves 20, 22 so as to optimize the pressure, thereby optimizing the cleaning operation (the wider the groove, the higher the pressure).

In the illustrative embodiment, the roller member 18 may be formed from a material selected from the group consisting of: (i) steel, (ii) stainless steel, and (iii) ceramic. Alternatively, or in addition to being formed from one of these materials, the roller member 18 of the illustrative embodiment may be coated with a material selected from the group consisting of: (i) ceramic, (ii) diamond, and (iii) diamond-like carbon.

The illustrative cleaning roller assembly 10 of FIGS. 1-4 further comprises a stop mechanism that restricts the roller member 18 to rotating less than 360 degrees. The roller member 18 is configured to rotate less than 360 degrees as the drive member (e.g., take-up reel 78) of the tape transport assembly changes direction so that the tape stiction is able to dissipate, and then the stop mechanism is configured to prevent the roller member 18 from further rotating so as to allow the slanted opposed grooves 20, 22 of the roller member 18 to burnish and/or clean the tape media (e.g., tape media 80 in FIG. 8). Advantageously, the design of the roller assembly prevents the tape media from sticking to the roller member 18, which could undesirably result in the breaking of the tape media. In the illustrative embodiment, the lapping action of the slanted opposed grooves 20, 22 in the roller member 18 is achieved by limiting the rotation of the roller member 18, and then slipping action between the tape media and the roller member 18 creates the lapping action between the tape media and the edges of slanted opposed grooves 20, 22. When the rotation of the roller member 18 has ceased, the slanted opposed grooves 20, 22 allow the drive member of the tape transport assembly to operate normally because the slanted opposed grooves 20, 22 create a stabilizing guiding force, while the edges of slanted opposed grooves 20, 22 remove excess debris away from the tape media, and into the grooves 20, 22.

Advantageously, in the illustrative embodiment, the edges of the slanted opposed grooves 20, 22 of the roller member 18 smooth high level asperities and/or peaks in the tape media that are known to cause magnetoresistance (MR) recession in the tape head. The slipping action between the tape media and the roller member 18 results in a desired smoothing of a damaging portion of an abrasive material in the tape media that damages the tape head.

Turning again to FIGS. 1-3 of illustrative cleaning roller assembly 10, it can be seen that the stop mechanism comprises a first stop element 28 on the roller member 18 and a second stop element 32 on the roller bearing member 30. The roller member 18 is prevented from further rotation when the first stop element 28 on the roller member 18 contacts the second stop element 32 on the roller bearing member 30. In the illustrative embodiment, the first stop element 28 on the roller member 18 is in a form of a rectangular protrusion extending into the roller central recess 24, while the second stop element 32 on the roller bearing member 30 is in a form of a rectangular protrusion extending radially outward from the outer surface of the roller bearing member 30 (see FIGS. 1-3). Also, as shown in the illustrative embodiment of FIGS. 3 and 4, the roller member 18 comprises a plurality of inner protrusions 26 spaced apart from one another in an axial direction of the roller central recess 24. Also, referring to FIG. 4, it can be seen that one end of the roller member 18 may be provided with a tapered inner edge 38 to accommodate the stepped base 14 of the shaft member 12 (see FIG. 3).

In the illustrative embodiment, the roller member 18 rotates in a partial rotation as the drive changes direction to allow the tape stiction to dissipate, then the roller 18 stops rotating (when first stop element 28 contacts the second stop element 32) to allow the helical grooves 20, 22 to burnish and clean the media. The opposing helical grooves 20, 22 also guide the tape with the opposing forces in a manner where the drive can function normally to enable the drive to run all the typical drive functions like data write/read and test at the same time as the burnishing. The lapping action is accomplished by limiting the roller rotation and the slipping action creates the required lapping function between the tape media and the roller groove edges. Advantageously, even when the roller 18 is not rotating, the helical grooves 20, 22 allow the drive to operate normally because the opposing grooves 20, 22 create a stabilizing guiding force and the groove edges remove the excess debris away from the tape into the grooves and away from the tape, and additionally, the hard edges of the grooves smooth the high level tape asperities and peaks that are known to cause MR recession. The relative "slipping" between the tape media and roller 18 results in the desired smoothing of the damaging portion of the abrasive material in the media that damages the tape head.

Figure 6:
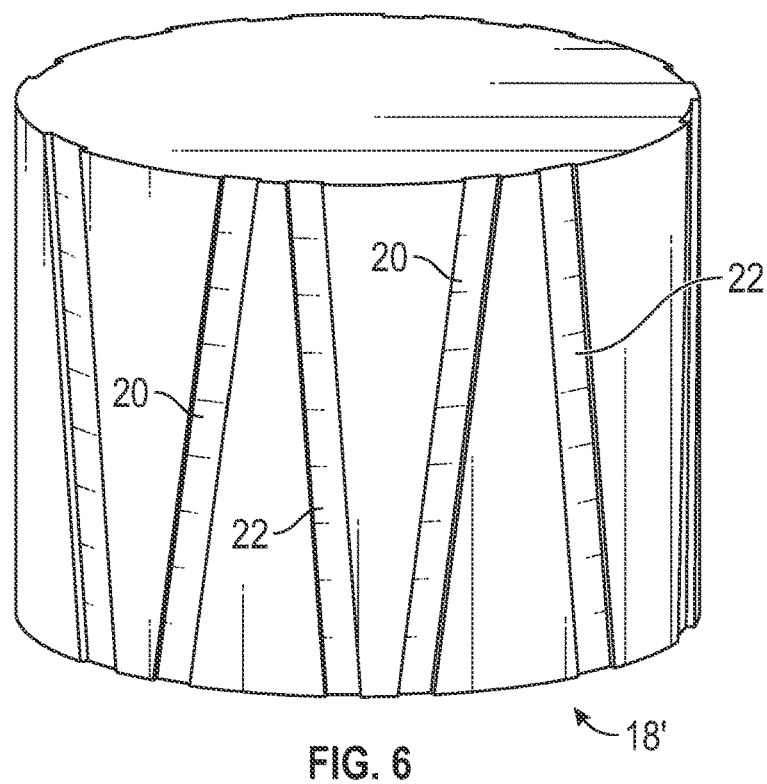
FIG. 6 is a perspective view of a cleaning roller, according to another illustrative embodiment of the invention, wherein the roller is provided with a plurality of slanted grooves.

In FIG. 6, another illustrative embodiment of a cleaning roller member 18' with slanted opposed grooves 20, 22 is depicted. The roller member 18' of FIG. 6 is similar in many respects to the roller member 18 of FIGS. 1-4, except that the central portion of the roller member 18' is different from the roller member 18.

Figure 7:
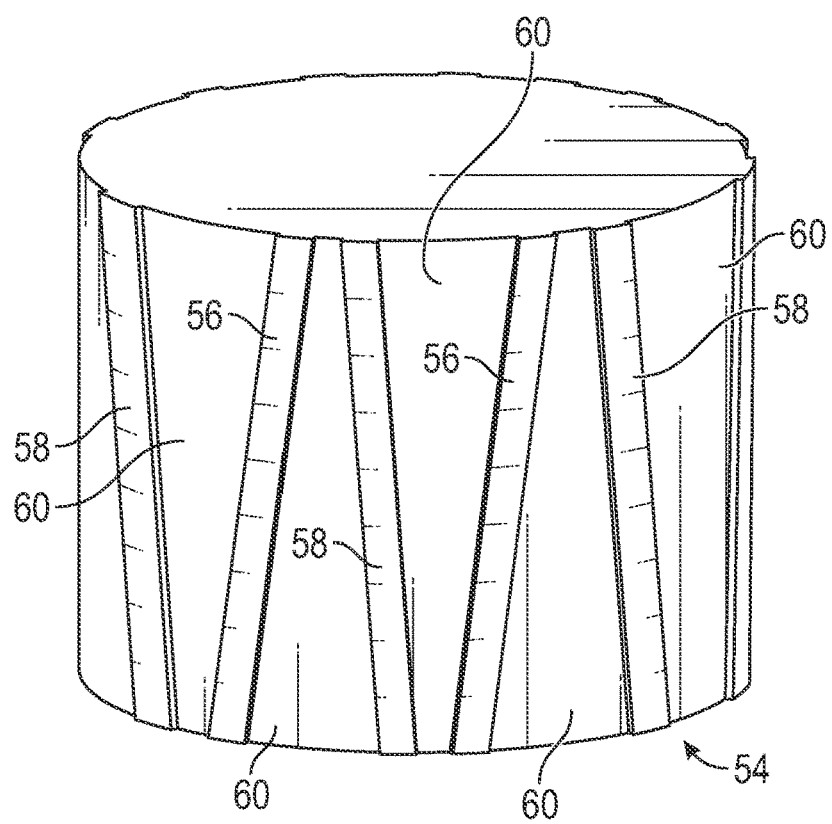
FIG. 7 is a perspective view of a cleaning roller, according to yet another illustrative embodiment of the invention, wherein the roller is provided with a plurality of slanted protrusions.

In FIG. 7, an alternative embodiment of a cleaning roller member is illustrated. The cleaning roller member 54 of FIG. 7 is provided with a plurality of slanted protrusions 56, 58 extending from the outer surface of the roller member 54, rather than being provided with the slanted opposed grooves 20, 22 of the roller members 18, 18'. Similar to the grooves 20, 22 of the roller members 18, 18', the slanted protrusions 56, 58 of the cleaning roller member 54 use a lapping action to burnish and/or clean the tape media (e.g., tape media 80 in FIG. 8). In the illustrative embodiment, each of the slanted protrusions 56, 58 is disposed at an acute angle relative to a rotational axis of the roller member 54. Also, as shown in FIG. 7, the plurality of slanted protrusions 56, 58 are spaced apart from one another about a circumference of the roller member 54 by respective triangular recesses 60 formed in the outer surface of the roller member 54. In the illustrative embodiment, each slanted protrusion 56, 58 extends generally perpendicular to the direction of tape travel.

Figure 5:
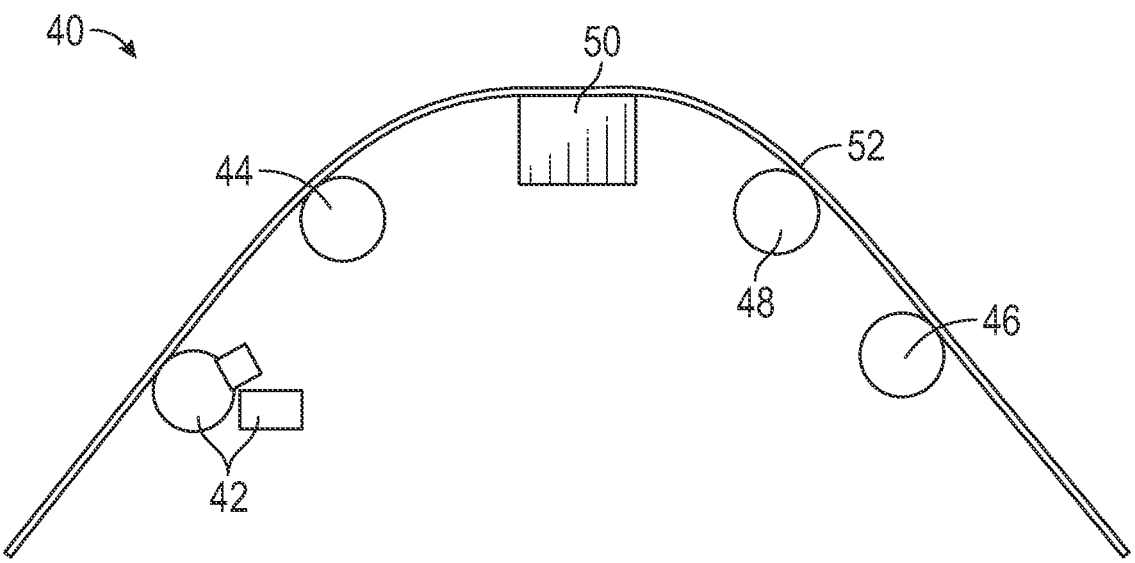
FIG. 5 is a schematic diagram of a portion of a tape drive, according to an illustrative embodiment of the invention.

Another illustrative embodiment of a magnetic tape drive is seen generally at 40 in FIG. 5. FIG. 5 depicts a schematic diagram of a portion of a magnetic tape drive 40 with magnetic tape media 52. Referring to FIG. 5, it can be seen that the magnetic tape drive 40 generally comprises four (4) rollers 42, 44, 48, 46 that are arranged in a sequence from a cartridge side of the tape drive 40 to a take-up reel side of the tape drive 40, and a tape head 50 is located in the middle between the second roller 44 and the third roller 48. The tape head 50 is configured to perform read-write operations on the tape media 52. Similar to the magnetic tape drive 62 described above, the first roller in the sequence of the tape drive 40 of FIG. 5 comprises a cleaning roller assembly 42 (schematically represented in FIG. 5), but in other embodiments, some or all of the other rollers 44, 46, 48 of the tape drive 40 may also comprise cleaning rollers.

The cleaning roller 18, 18', 54 described herein may be used in a plurality of different types of tape drives. For example, in one or more embodiments, the tape drive utilizing the cleaning roller is in a form of a peripheral tape drive configured to be operatively coupled to a computing device (e.g., a laptop or desktop computer). In these one or more embodiments, the peripheral tape drive comprises a tape head configured to perform read-write operations on the tape media, and the roller member is configured to burnish and/or clean the tape media so as to prevent damage to the tape head of the peripheral tape drive (e.g., the peripheral tape drive 82 may include the components of the magnetic tape drive 62 depicted in FIG. 8).

As another example, in one or more other embodiments, the tape drive utilizing the cleaning roller is provided as a part of a tape library. In these one or more embodiments, the tape drive comprises the tape head configured to perform read-write operations on the tape media, and the roller member is configured to burnish and/or clean the tape media so as to prevent damage to the tape head of the tape drive in the tape library (e.g., the tape library 84 may include the components of the magnetic tape drive 62 depicted in FIG. 8).

As yet another example, in yet one or more other embodiments, the tape drive utilizing the cleaning roller is used to precondition tape media prior to the tape media coming into contact with the tape head so as to prevent damage to the tape head (e.g., the tape drive is in a form of a special cleaning drive).

In one or more further embodiments, the tape drive utilizing the cleaning roller may also be used to test the tape media for errors and clean the typical media oil and debris that are known to cause excessive data errors and clogged tape heads.

It is readily apparent that the aforedescribed cleaning roller assembly for tape drives offers numerous advantages. In particular, the cleaning roller assembly is able to effectively burnish and/or clean tape media so as to prevent tape head damage.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A tape drive, comprising:
a tape transport assembly, the tape transport assembly including a drive member, the drive member of the tape transport assembly configured to displace tape media in the tape drive; and
a tape roller assembly, the tape roller assembly including a roller member, the roller member having one or more slanted grooves or protrusions formed in an outer surface of the roller member, the roller member configured to support and/or guide the tape media as the tape media is displaced by the tape transport assembly, the one or more slanted grooves or protrusions of the roller member configured to burnish and/or clean the tape media so as to prevent damage to a tape head, and the one or more slanted grooves or protrusions of the roller member being angled so as to prevent the tape media from sliding in an axial direction of the roller member, and the tape roller assembly further comprises a stop mechanism, the roller member being configured to rotate less than 360 degrees as the drive member of the tape transport assembly changes direction so that tape stiction is able to dissipate, and then the stop mechanism is configured to prevent the roller member from further rotating so as to allow the one or more slanted grooves or protrusions of the roller member to burnish and/or clean the tape media.

2. The tape drive according to claim 1, wherein the tape drive is in a form of a peripheral tape drive configured to be operatively coupled to a computing device, the peripheral tape drive further comprising the tape head, the tape head configured to perform read-write operations on the tape media, and the roller member configured to burnish and/or clean the tape media so as to prevent damage to the tape head of the peripheral tape drive.

3. The tape drive according to claim 1, wherein the tape drive is provided as a part of a tape library, the tape drive further comprising the tape head, the tape head configured to perform read-write operations on the tape media, and the roller member configured to burnish and/or clean the tape media so as to prevent damage to the tape head of the tape drive in the tape library.

4. The tape drive according to claim 1, wherein the tape drive is used to precondition the tape media prior to the tape media coming into contact with the tape head so as to prevent damage to the tape head.

5. The tape drive according to claim 1, wherein the one or more slanted grooves or protrusions formed in the outer surface of the roller member comprise at least one pair of slanted opposed grooves that use a lapping action to burnish and/or clean the tape media, each of the slanted opposed grooves being disposed at an acute angle relative to a rotational axis of the roller member.

6. The tape drive according to claim 5, wherein the at least one pair of slanted opposed grooves formed in the outer surface of the roller member comprises a plurality of pairs of slanted opposed grooves spaced apart from one another about a circumference of the roller member.

7. The tape drive according to claim 6, wherein the plurality of pairs of slanted opposed grooves create a helical pattern when the roller member is rotated about the rotational axis thereof.

8. The tape drive according to claim 5, wherein the respective grooves of the at least one pair of slanted opposed grooves converge towards one another at a first end of the roller member such that ends of the converging opposed grooves are located closer to one another at the first end of the roller member as compared to a second end of the roller member that is oppositely disposed relative to the first end of the roller member.

9. The tape drive according to claim 1, wherein the roller member is formed from a material selected from the group consisting of: (i) steel, (ii) stainless steel, and (iii) ceramic.

10. The tape drive according to claim 1, wherein the roller member is coated with a material selected from the group consisting of: (i) ceramic, (ii) diamond, and (iii) diamond-like carbon.

11. The tape drive according to claim 1, wherein the one or more slanted grooves or protrusions formed in the outer surface of the roller member comprise a plurality of slanted protrusions that use a lapping action to burnish and/or clean the tape media, each of the slanted protrusions being disposed at an acute angle relative to a rotational axis of the roller member.

12. The tape drive according to claim 11, wherein at least some of the slanted protrusions are spaced apart from one another about a circumference of the roller member by respective triangular recesses formed in the outer surface of the roller member.

13. The tape drive according to claim 1, wherein the tape drive comprises the tape head, the tape head configured to perform read-write operations on the tape media, and the tape roller assembly is disposed in a location that is upstream of the tape head so that the tape media is burnished and/or cleaned prior to reaching the tape head of the tape drive.

14. The tape drive according to claim 1, wherein the tape roller assembly further comprises a shaft member, the roller member configured to rotate about the shaft member.

15. The tape drive according to claim 14, wherein the tape roller assembly further comprises a roller bearing member, the roller bearing member configured to engage the shaft member such that the roller bearing member remains stationary with the shaft member as the roller member rotates about the shaft member.

16. The tape drive according to claim 15, wherein the stop mechanism comprises a first stop element on the roller member and a second stop element on the roller bearing member, and the roller member is prevented from further rotation when the first stop element on the roller member contacts the second stop element on the roller bearing member.

17. A tape drive, comprising:
a tape transport assembly, the tape transport assembly including a drive member, the drive member of the tape transport assembly configured to displace tape media in the tape drive; and
a tape roller assembly, the tape roller assembly including a roller member, the roller member having one or more slanted grooves or protrusions formed in an outer surface of the roller member, the roller member configured to support and/or guide the tape media as the tape media is displaced by the tape transport assembly, the one or more slanted grooves or protrusions of the roller member configured to burnish and/or clean the tape media so as to prevent damage to a tape head, and the one or more slanted grooves or protrusions of the roller member being angled so as to prevent the tape media from sliding in an axial direction of the roller member;

wherein the one or more slanted grooves or protrusions formed in the outer surface of the roller member comprise at least one pair of slanted opposed grooves that use a lapping action to burnish and/or clean the tape media, each of the slanted opposed grooves being disposed at an acute angle relative to a rotational axis of the roller member;

wherein the tape roller assembly further comprises a stop mechanism that restricts the roller member to rotating less than 360 degrees; and wherein the lapping action of the slanted opposed grooves in the roller member is achieved by limiting the rotation of the roller member, and then slipping action between the tape media and the roller member creates the lapping action between the tape media and edges of the slanted opposed grooves, and when the rotation of the roller member has ceased, the slanted opposed grooves allow the drive member of the tape transport assembly to operate normally because the slanted opposed grooves create a stabilizing guiding force, while the edges of the slanted opposed grooves remove excess debris away from the tape media, and into the grooves.

18. The tape drive according to claim 17, wherein the edges of the slanted opposed grooves smooth high level asperities and/or peaks in the tape media that are known to cause magnetoresistance recession;

wherein the slipping action between the tape media and the roller member results in a desired smoothing of a damaging portion of an abrasive material in the tape media that damages the tape head.

\* \* \* \* \*